United States Patent
Liu et al.

(10) Patent No.: US 10,569,440 B2
(45) Date of Patent: Feb. 25, 2020

(54) CLEARING DEVICE, OPERATING METHOD THEREOF, AND CUTTING DEVICE

(71) Applicants: BOE TECHNOLOGY GROUP CO., LTD., Beijing (CN); Hefei Xinsheng Optoelectronics Technology Co., Ltd., Anhui (CN)

(72) Inventors: Ping Liu, Beijing (CN); Qingyu Hu, Beijing (CN); Yong Sub Kim, Beijing (KR)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 176 days.

(21) Appl. No.: 15/823,730

(22) Filed: Nov. 28, 2017

(65) Prior Publication Data

US 2018/0236681 A1    Aug. 23, 2018

(30) Foreign Application Priority Data

Feb. 23, 2017 (CN) .......................... 2017 1 0098889

(51) Int. Cl.
  *B26D 7/18* (2006.01)
  *B26D 5/00* (2006.01)
  (Continued)

(52) U.S. Cl.
  CPC ................ *B26D 7/18* (2013.01); *B08B 13/00* (2013.01); *B26D 5/005* (2013.01); *B26D 7/1818* (2013.01);
  (Continued)

(58) Field of Classification Search
  CPC ........ B26D 1/18; B26D 5/005; B26D 7/1818; B26D 7/1854; B26D 7/22; B08B 13/00;
  (Continued)

(56) References Cited

U.S. PATENT DOCUMENTS 3,768,352 A * 10/1973 Campbell ............... B27B 5/061
                                                    83/104
4,381,686 A *  5/1983 Ess ......................... B27B 5/061
                                                    83/104
(Continued)

FOREIGN PATENT DOCUMENTS

CN    1275472 A    12/2000
CN    1277092 A    12/2000
CN    106347006 A   1/2017

OTHER PUBLICATIONS

First Office Action for Chinese Patent Application No. 201710098889.5 dated Mar. 26, 2018.

*Primary Examiner* — Dung Van Nguyen
(74) *Attorney, Agent, or Firm* — Calfee, Halter & Griswold LLP

(57) ABSTRACT

A clearing device, an operating method thereof, and a cutting device are provided. The clearing device includes: an operating platform, including an operating surface; a first clearing unit, provided on a side of the operating platform close to the operating surface; a control unit, configured to communicate with the first clearing unit and control a clearing operation and a count of the operation of the first clearing unit; at least one detecting unit, provided on the operating platform and communicatively connected to the control unit, wherein the first clearing unit is configured to clear a foreign matter on the operating surface, the detecting unit is configured to detect a degree of cleanliness of the (Continued)

operating surface and send to the control unit a data signal which reflects the degree of cleanliness of the operating surface.

11 Claims, 2 Drawing Sheets

(51) Int. Cl.
    *B26D 7/22*     (2006.01)
    *C03B 33/03*     (2006.01)
    *C03B 33/037*     (2006.01)
    *B08B 13/00*     (2006.01)
    *B08B 1/00*     (2006.01)
    *B08B 5/04*     (2006.01)
    *B08B 3/02*     (2006.01)
    *B08B 5/02*     (2006.01)

(52) U.S. Cl.
    CPC ............. *B26D 7/1854* (2013.01); *B26D 7/22* (2013.01); *C03B 33/03* (2013.01); *C03B 33/037* (2013.01); *B08B 1/002* (2013.01); *B08B 3/02* (2013.01); *B08B 5/02* (2013.01); *B08B 5/04* (2013.01); *B65G 2249/04* (2013.01); *Y02P 40/57* (2015.11)

(58) Field of Classification Search
    CPC .. B08B 1/002; B08B 5/02; B08B 5/04; C03B 33/03; C03B 33/037; Y02P 40/57; B65G 2249/04
    See application file for complete search history.

(56) References Cited

U.S. PATENT DOCUMENTS

| | | | |
|---|---|---|---|
| 5,176,056 A * | 1/1993 | Tagliaferri | B23D 47/042 83/157 |
| 5,201,258 A * | 4/1993 | Cremona | B23D 47/025 144/245.1 |
| 5,695,600 A | 12/1997 | Goin | |
| 5,701,789 A | 12/1997 | Okonski | |
| 2007/0095179 A1* | 5/2007 | McCarty | B26D 1/18 83/13 |
| 2009/0188960 A1* | 7/2009 | Lee | C03B 33/0222 225/96.5 |
| 2009/0230102 A1* | 9/2009 | Soyama | B28D 1/221 219/121.69 |
| 2011/0283855 A1* | 11/2011 | Kwarta | B26D 1/185 83/425.4 |

\* cited by examiner

CLEARING DEVICE, OPERATING METHOD THEREOF, AND CUTTING DEVICE

CROSS-REFERENCES TO RELATED APPLICATIONS

This application claims priority to Chinese Patent Application No. 201710098889.5 filed in China on Feb. 23, 2017, the entire contents of which are hereby incorporated by reference.

TECHNICAL FIELD

The present disclosure relates to a clearing device, an operating method thereof, and a cutting device.

BACKGROUND

During a cutting process of a product (e.g. a display panel), the cutting device will cut off a useless dummy region from the display panel. Before entering a next process (e.g. cutting a subsequent product), a foreign matter (e.g., chippings generated by cutting, or the like) on an operating platform of the cutting device needs to be cleared, for example, sweeping the foreign matter into a crushing machine by means of a clearing device.

It should be noted that, information disclosed in the above background portion is provided only for better understanding of the background of the present disclosure, and thus it may contain information that does not form the prior art known by those ordinary skilled in the art.

SUMMARY

At least one embodiment of the present disclosure provides a clearing device, an operating method thereof, and a cutting device.

At least one embodiment of the present disclosure provides a clearing device including: an operating platform, including an operating surface; a first clearing unit, provided on a side of the operating platform close to the operating surface; a control unit, configured to communicate with the first clearing unit and control a clearing operation and a count of the operation of the first clearing unit; at least one detecting unit, provided on the operating platform and communicatively connected to the control unit, wherein the first clearing unit is configured to clear a foreign matter on the operating surface, the detecting unit is configured to detect a degree of cleanliness of the operating surface and send to the control unit a data signal which reflects the degree of cleanliness of the operating surface.

At least one embodiment of the present disclosure provides a cutting device, including a clearing device, wherein the clearing device includes: an operating platform, including an operating surface; a first clearing unit, provided on a side of the operating platform close to the operating surface; a control unit, configured to communicate with the first clearing unit and control a clearing operation and a count of the operation of the first clearing unit; at least one detecting unit, provided on the operating platform and communicatively connected to the control unit, wherein the first clearing unit is configured to clear a foreign matter on the operating surface, the detecting unit is configured to detect a degree of cleanliness of the operating surface and send to the control unit a data signal which reflects the degree of cleanliness of the operating surface.

At least one embodiment of the present disclosure provides an operating method of any of the above-described clearing devices, including: controlling the first clearing unit to perform a clearing operation once on the operating surface; detecting the degree of cleanliness of the operating surface, and sending the detected data signal to the control unit; and controlling the control unit to analyze the data signal, to judge whether to perform a next clearing operation.

It is to be understood that both the foregoing general description and the following detailed description are exemplary and explanatory only and are not restrictive of the present disclosure, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

In order to more clearly illustrate the technical solutions of embodiments of the present disclosure, the drawings of the embodiments will be briefly described below. It will be apparent that the drawings in the following description are merely illustrative of some embodiments of the present disclosure and are not intended to be limiting of the present disclosure.

REFERENCE NUMERALS

Figure 1:
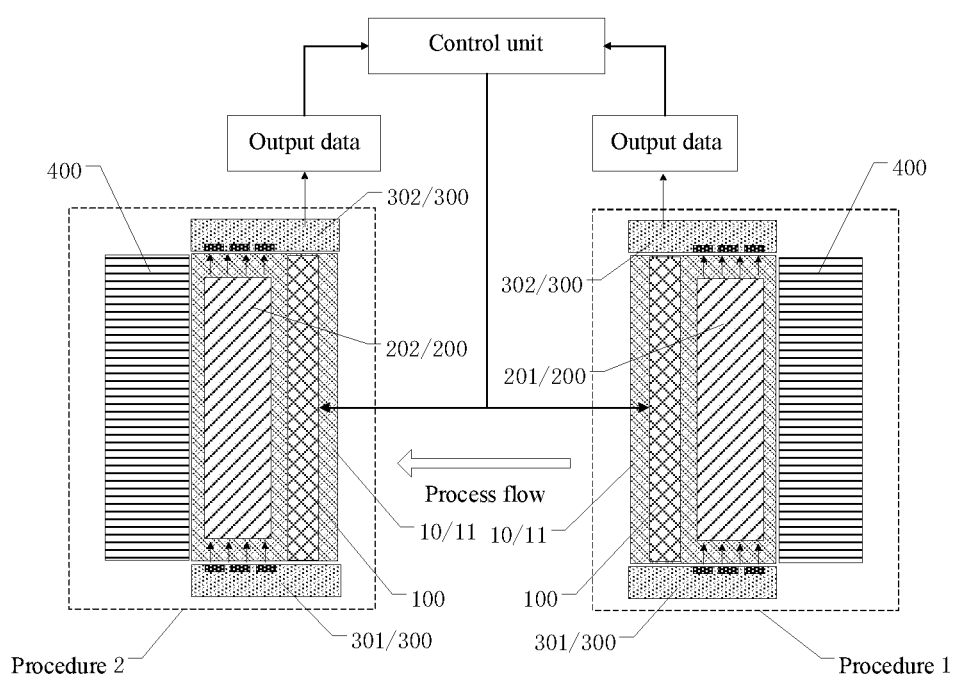
FIG. 1 is a schematic structural view of a clearing device provided by an embodiment of the present disclosure.

10—operating platform; 11—operating surface; 100—first clearing unit; 200—display panel; 201—first display panel; 202—second display panel; 300—detecting unit; 301—transmitting terminal; 302—receiving terminal; 400—crushing machine.

DETAILED DESCRIPTION

Hereinafter, the present disclosure will be described in further detail with reference to the accompanying drawings, such that the objectives, technical solutions and advantages of the present disclosure may be more apparent. Obviously, the described embodiments are merely part of the present disclosure, and not all embodiments. All other embodiments obtained based on embodiments in the present disclosure by those of ordinary skill in the art without making creative work are within the protection scope of the present disclosure.

Unless otherwise defined, technical or scientific terms used herein are to be interpreted as customary in the art to which the present disclosure belongs. Terms such as "first", "second", and the like used in the present disclosure do not indicate any order, quantity or importance, instead, they are used to distinguish different components. Terms such as "comprise" or "include" or the like intend to mean that the element or object before the word covers the elements or objects and their equivalents listed after the word, without excluding other elements or objects. Terms such as "connect" or "connected with" or the like are not limited to physical or mechanical connection, but may include electrical connection, either directly or indirectly. Terms such as "upper", "lower", "left", "right" and the like are used to indicate relative positional relations, and the relative positional relation will change correspondingly as the absolute position of the described object changes.

During the cutting process of the display panel, the dummy part of the display panel needs to be cut off. The cut dummy part drops on the operating platform and needs to be cleared away. After the clearing operation is performed, a foreign matter may still remain on the operating platform. For example, a brush is used to clear the operating platform: the brush will be worn after performing repeated clearing operations on the operating platform, which results in that the dummy part at the worn part of the brush is not cleared and remains on the operating platform in the subsequent process of clearing the cut dummy part. Alternatively, when the clearing operation is carried out, a large press-in extent of the brush may crush the cut dummy part to form chippings and the chippings may remain in the brush, causing that the brush carrying the chippings will re-bring the chippings onto the operating platform in the follow-up clearing process. In the product process, particles within the relevant equipment and other external factors may also be brought onto the platform. For illustrative purposes, the dummy parts, chippings and other substances that need to be cleared will be collectively referred to as "foreign matter" in this specification.

If a foreign matter exists on the operating platform, during the processing of the product, e.g., during the cutting process of the display panel, the portion of the display panel where the foreign matter is located may be raised, thus causing the display panel to be unevenly placed. During the cutting process, the unevenly placed display panel may result in uneven cutting, thus affecting the product yield.

For the above technical problems, there is provided a coping approach which mainly sets a fixed count of the clearing operation, such as twice, in the procedure where a foreign matter may be left. Firstly, this approach performs the clearing operation regardless of the presence of the foreign matter on the platform, which may accelerate wear of the clearing unit, such as wear of the brush; secondly, the operating platform is usually covered with protective glass to protect the operating platform, if the operating platform is cleared repeatedly regardless of the presence of the foreign matter on the operating platform, it will also accelerate the wear of the protective glass; moreover, although the approach to clear the operating platform repeatedly may improve the possibility to clear the foreign matter on the operating platform, it still cannot guarantee that all the foreign matter on the platform will be cleared up. Therefore, the traditional clearing method for this technical problem accelerates wear of the equipment while increasing the production duration of the product, which cannot guarantee the product yield and also increases the production cost.

At least one embodiment of the present disclosure provides a clearing device and the operating method thereof and a display panel, to solve the technical problems described above. The clearing device may include: an operating platform, including an operating surface; a first clearing unit, provided on a side of the operating platform close to the operating surface; a control unit, configured to communicate with the first clearing unit and control a clearing operation and a count of the operation of the first clearing unit; at least one detecting unit, provided on the operating platform and communicatively connected to the control unit, wherein the first clearing unit is configured to clear a foreign matter on the operating surface, the detecting unit is configured to detect a degree of cleanliness of the operating surface and send to the control unit a data signal which reflects the degree of cleanliness of the operating surface.

The clearing device provided by the embodiment of the present disclosure may detect whether a foreign matter remains on the operating surface of the operating platform in real time by providing a detecting unit on the operating platform, thereby determining whether or not the clearing device continues to perform the clearing operation on the operating surface. In this way, the cleanliness of the operating surface may be guaranteed while the loss of the equipment such as the first clearing unit may be minimized. Exemplarily, for example, after the first clearing unit of the clearing device performs the clearing operation on the operating surface, the detecting unit detects the degree of cleanliness of the operating surface and sends to the control unit a data signal reflecting the degree of cleanliness of the operating surface. The control unit processes the data signal, and judges whether to control the clearing system to perform the subsequent clearing operation on the operating platform based on whether the operating surface is clean or not.

For example, in the embodiment of the present disclosure, the first clearing unit may include a brush removing device. It is to be noted that the first clearing unit may also be an air jetting device or a water washing device or the like, but in actual production processes, human intervention is generally required to clear the foreign matter on the operating surface when the air jetting device such as an air gun and a washing device such as a water gun are employed. In order to realize the automation of the clearing device, in the embodiment of the present disclosure, the technical solutions of present disclosure will be described by way of taking a brush removing device such as a brush as the first clearing unit.

It should be noted that the detecting unit is not limited to detecting the degree of cleanliness of the operating surface after the first clearing unit has cleared the operating surface. As an example, since the detection of the operating surface by the detecting unit may be real-time, if the operating surface detected by the detecting unit is reflected as being cleared before the first clearing unit clears the operating surface, there is no need for the first clearing unit to perform the clearing operation on the operating surface. An embodiment of the present disclosure provides a clearing device, and FIG. 1 is a schematic structural view of a clearing device provided by an embodiment of the present disclosure. For example, as shown in FIG. 1, the clearing device includes: an operating platform 10, a first clearing unit 100, a detecting unit 300, and a control unit, wherein the operating platform includes an operating surface 11. The first clearing unit 100 is provided on a side of the operating platform 10 close to the operating surface 11. The control unit is configured to communicate with the first clearing unit and control a clearing operation and a count of the operation of the first clearing unit. The detecting unit 300 is provided on the operating platform and communicatively connected to the control unit. The detecting unit 300 is configured to detect a degree of cleanliness of the operating surface 11 and send to the control unit a data signal which reflects the degree of cleanliness of the operating surface 11.

For example, in an embodiment provided by the present disclosure, the control unit may be a dedicated computer device (e.g., a digital processor (DSP), a single-chip microcomputer, a programmable logic controller (PLC), etc.), or a general purpose computing device (e.g., a central processing unit (CPU)), etc., which is not limited by the embodiments of the present disclosure.

It should be noted that the clearing device provided by the embodiment of the present disclosure may be applied to all procedures and apparatuses that require the clearing operation. For example, the apparatus may be applied to cut all objects that may be processed (cut). For example, the object to be handled may be a flat plate. For example, the flat plate may be a metal panel or a non-metallic panel. The non-metallic panel may be, for example a glass panel, a quartz panel, a ceramic panel, a plastic panel, or a silicone panel, and the like, and, for another example, a panel that formed with a functional component, such as a liquid crystal display panel, an OLED display panel, and the like. The metal panel may be, for example, an electro-galvanized steel sheet, a hot dip galvanizing steel sheet, an aluminized zinc steel sheet, or a copper plate and so on. In order to facilitate the explanation of the technical solution of the present disclosure, an example in which the clearing device is applied to an apparatus to cut the display panel is described in the following embodiments.

The procedure 1 and procedure 2 in FIG. 1 represent that the same operating platform is in different procedures. For example, the clearing device clears the foreign matter remaining on the operating surface 11 after the display panel 300 is cut. As a result, For example, the foreign matter will remain on the operating surface 11 after the first display panel 201 is processed in the procedure 1, and the foreign matter will be cleared by the clearing device in the procedure 1. After the cleaning, the operating platform enters a next procedure, i.e. the procedure 2. The second processing panel 202 is subjected to the same processing and clearing process in the procedure 2. Thus, the degree of cleanliness of the operating surface in procedure 1 will affect the quality of the processing, such as cutting, of the second display panel 202 in procedure 2. For example, the foreign matter may remain on the operating surface 11 after the clearing process in the procedure 1, and the second display panel 202 will be unevenly placed on the operating surface 11 due to the residual foreign matter, thereby affecting the quality of the subsequent processing and reducing the product yield.

It is to be noted that, the technical solution of the present disclosure ensures that the operating surface in the procedures is clean on the premise with the count of clearing operation as few as possible, which is irrelevant to the process relationship between different procedures. In order to facilitate understanding of the technical solution of the present disclosure, in the following embodiments, the structure of the clearing device will be described by taking one of the procedures in the system, for example, the procedure 1 as an example.

For example, in the clearing device provided by the embodiment of the present disclosure, as shown in FIG. 1, the detecting unit 300 may include a transmitting terminal 301 for transmitting a signal and a receiving terminal 302 for receiving the signal. The transmitting terminal 301 and the receiving terminal 302 are provided at two opposite sides of the operating platform.

In the embodiment of the present disclosure, the signal transmitted by the transmitting terminal 301 may include a laser or an ultrasonic wave, or the like. Correspondingly, the detecting unit 300 may be a laser detecting unit or an ultrasonic detecting unit or other detecting devices. For example, the detecting unit 300 may be the laser detecting unit. The detecting unit 300 may be a gas laser (e.g., a carbon dioxide laser), a solid-state laser (e.g., a yttrium aluminum garnet laser or a ruby laser, etc.), a semiconductor laser (e.g., a double heterojunction laser or a large optical cavity laser), a fiber laser (e.g., a crystal fiber laser) or an excimer lasers (e.g., an inert gas excimer laser, a mercury halide excimer laser or a polyatomic excimer lasers) and the like.

Exemplarily, the detecting unit 300 is, for example, the laser detecting unit, the transmitting terminal 301 emits a laser to the receiving terminal 302. The laser is parallel to the operating surface 11 and close to the operating surface 11. The specific value between the laser and the operating surface 11 may be determined according to degree of cleanliness of the operating surface 11 by the actual process. For example, a distance between the laser and the operating surface 11 is no more than 1 μm. When a foreign matter exists on the operating surface 11, the foreign matter will block the laser at the position where the foreign matter is located, such that the receiving terminal 302 at the corresponding position cannot receive the laser. When the operating surface 11 is clear, the laser emitted by the transmitting terminal 301 may be normally received by the receiving terminal 302, and finally the corresponding data signal generated by the receiving terminal 302 is transmitted to the control unit for processing, so that it is possible to determine whether or not a foreign matter exists on the operating surface 11.

In the embodiment of the present disclosure, the detecting unit may be provided so that the detecting range thereof may cover the operating surface 11. For example, the detecting unit 300 is the laser detecting unit, the degree of cleanliness of the operating surface 11 may be detected as long as the laser between the transmitting terminal 301 and the receiving terminal 302 of the detecting unit 300 may cover the operating surface 11 of the operating platform.

For example, in the clearing device provided by the embodiment of the present disclosure, when the data signal reflects that the operating surface is not clear, the control unit is configured to control the first clearing unit to sweep the operating surface again; or when the data signal reflects that the operating surface is clear, the control unit is configured to control the first clearing unit to stop sweeping the operating surface. Compared with the traditional clearing device, it is possible to prevent the clearing device from performing additional clearing operation when the operating surface is clear. In addition, in a case where a foreign matter still exists on the operating surface after the clearing operation, the detecting unit may detect the presence of the foreign matter, and then the first clearing unit continues to clear the foreign matter on the operating surface, thus ensuring the cleanliness of the operating surface.

For example, in the clearing device provided by the embodiment of the present disclosure, the control unit may be provided with a first threshold for limiting the count of operation of the first clearing unit. For example, the first threshold may be 3, 4 or 5, and the like. For example, in the clearing device provided by the embodiment of the present disclosure, an alarming system may be provided, which is communicated with the control unit. The setting of the first threshold and the alarming system may prevent repetitive operation of the clearing device, for example, in the event of equipment failure. For example, if the first threshold is set to be 3, and in the case where the equipment fails or the foreign matter is difficult to clean, when the count of operation of the first clearing unit is greater than 3, the clearing device stops running and the alarming system is activated for human intervention, which ensures product yield and provides security guarantee at the same time.

In one example of the embodiment of the present disclosure, for example, in the presence of a foreign matter on the operating surface of the clearing device, operation for once (for example, the preliminary operation) of the first clearing unit identified by the control unit may include following processes. S11, the detecting unit detects a degree of cleanliness of the operating surface and sends to the control unit a data signal which reflects the degree of cleanliness of the operating surface. S12, the control unit analyzes the data signal and then determines that the operating surface is not clear. S13, the control unit counts (the count of the operations is 1) and compares the value with the first threshold. S14, if the counted value is greater than the first threshold, the control unit may, for example, activate the alarming system and/or stop the clearing operation of the first clearing unit; if the counted value is less than or equal to the first threshold, the control unit controls the first clearing unit to perform a clearing operation on the operating surface. It should be noted that, in the present example, the step S13 of the control unit with respect to the counting may be arbitrarily arranged as long as it is before step S14.

For example, the clearing device provided by the embodiment of the present disclosure may further include a second clearing unit provided at a side of the operating surface of the operating platform. For example, in the embodiment of the present disclosure, the second clearing unit may be a vacuum suction device. For example, a length of the vacuum suction device may be the same as that of the operating surface. The vacuum suction device may clear the remaining chippings on the operating surface after the first clearing unit performs, for example, the preliminary clearing operation (for example, clearing large pieces of foreign matter on the operating surface). The cost of changing the clearing device by providing the vacuum suction device is low, and the degree of wear of the vacuum suction device is smaller compared with a case where the first clearing unit is, for example, a brush.

It is to be noted that the vacuum suction device may clean the foreign matter on the operating surface together with the first clearing unit described above, but the vacuum suction device may also clear the foreign matter on the operating surface in place of the first clearing unit described above when the clearing object of the clearing device is a small fragmented foreign matter.

For example, in the embodiment of the present disclosure, the control unit may be provided with the control unit is provided with a second threshold for limiting the count of the operation of the second clearing unit, such as the vacuum suction device. Since the vacuum device may be used as an alternative to the first clearing unit, the setting of the vacuum suction device and the second threshold may refer to the illustration of the first threshold value in the embodiment of the first clearing unit described above, and the process of the clearing operation for once of the vacuum suction device identified by the control unit may also refer to the above related description (S11 to S14) in the above-described embodiment of the first clearing unit, which will not be repeated herein.

For example, the clearing device provided by the embodiment of the present disclosure may further include a recycling unit, such as a crushing machine, provided at a side of the operating platform. As an example, the foreign matter on the operating surface is cleared into the crushing machine, for example, by the first clearing unit. The crushing machine may crush large pieces of foreign matter.

The embodiment of the present disclosure provides a cutting device which may include a clearing device in any of the above embodiments. For example, the cutting device is a device of cutting a display panel.

For example, the cutting device provided by the embodiment of the present disclosure may further include a cutting head which may be provided at a side of the operating platform close to the operating surface. For example, the cutting device is a device of cutting the display panel, the cut display panel is located between the operating surface and the cutting head. The display panel (motherboard) may include a daughterboard of the display panel and a dummy region at the periphery of the daughterboard of the display panel. The cutting head is configured to cut the display panel and separate the daughterboard of the display panel from the dummy region. For example, the dummy region separated by cutting may be a foreign matter to be cleared in the clearing device.

The embodiment of the present disclosure provides an operating method of the clearing device according to the above embodiments, which may include: controlling the first clearing unit to perform a clearing operation once on the operating surface; detecting the degree of cleanliness of the operating surface, and sending the detected data signal to the control unit; and controlling the control unit to analyze the data signal, to judge whether to perform the clearing operation for another time.

For example, in the operating method of the clearing device provided by the embodiment of the present disclosure, when the control unit determines that a foreign matter exists on the operating surface, performing the next clearing operation on the operating surface and detecting the degree of cleanliness of the operating surface which has been subject to the clearing operation; or when the control unit determines that no foreign matter exists on the operating surface, ending the clearing operation of the clearing device.

For example, the method of operating the clearing device provided by the embodiment of the present disclosure may further include: providing an alarming system and a first threshold for limiting the count of the operation of the first clearing unit, wherein the alarming system is activated when the count of the operation of the first clearing unit is greater than the first threshold.

Figure 2:
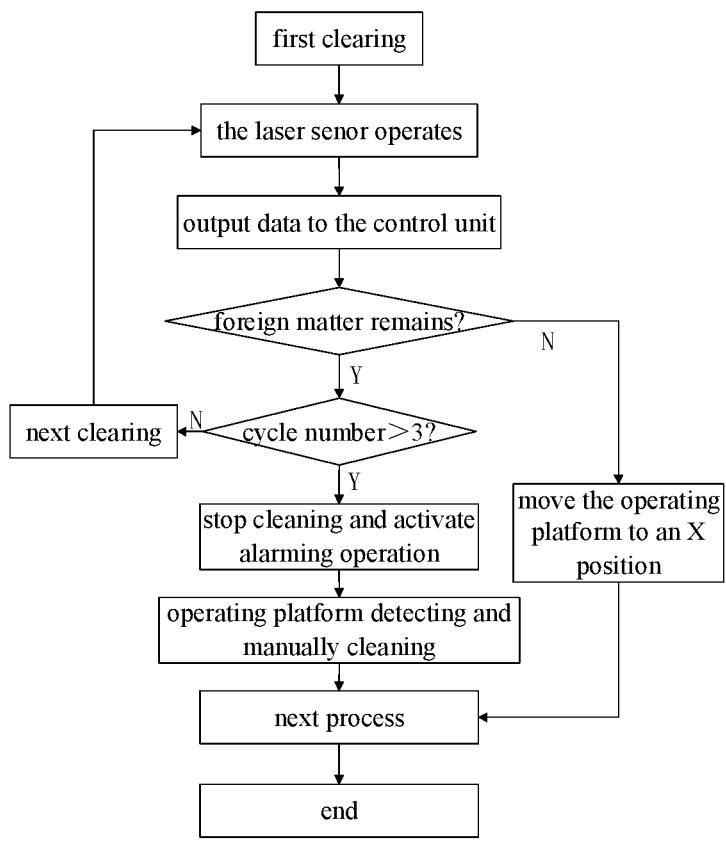
FIG. 2 is a flow chart of an operating method of a clearing device provided by an embodiment of the present disclosure.

An example of an embodiment of the present disclosure provides an operating method of a clearing device as described in the above embodiments, and FIG. 2 is a flow chart of an operating method of a clearing device provided by an embodiment of the present disclosure. For example, as shown in FIG. 2, operating steps of the clearing device in the present example may include following aspects.

S21: after the first clearing unit performs the first clearing operation on the operating surface, the detecting unit, such as a laser sensor, detects the degree of cleanliness of the operating surface and transmits the data signal reflecting the cleanliness of the operating surface to the control unit.

It is to be noted that the detection of the operating surface by the detecting unit is carried out in real time, so that the first clearing operation is not required if the operating surface detected by the detecting unit is in a clean state before the first clearing operation is carried out.

S22: the control unit analyzes the data signal to judge whether there is still a foreign object on the operating surface after the first clearing operation.

If the control unit determines that there is no foreign matter on the operating surface, the clearing operation of the clearing device is ended. Then, for example, after the operating surface in the clearing device moves to an X position, the process proceeds to a next step.

It should be noted that in the actual production operation, the operating platform in the clearing device can be moved in different positions to meet the needs of multiple machining operations (e.g., cutting, clearing, etc.). In order to facilitate the explanation of the present disclosure and the convenience of the drawings, the position at which the operating platform completes the machining operation and prepares to proceed to the next step is expressed as the X position.

If the control unit determines that there is still a foreign matter on the operating surface, the first clearing unit in the clearing device continues to perform the clearing operation on the operating surface. This process (clearing operation) is repeated when there is a foreign matter on the operating surface.

It should be noted that the clearing operation of the first clearing unit will enter into an endless loop of repeating the clearing operation when the equipment fails or the foreign matter on the operating surface is difficult to clean, and the like. In order to avoid such problems, the control unit may be provided with a first threshold for limiting the count of the operation of the first clearing unit. For example, the first threshold is 3, and when the count of the clearing operation of the first clearing unit is greater than 3, it is possible to remind the human intervention. For example, the reminding method may be implemented as setting an alarming system in communication with the control unit. When the count of the clearing operations is greater than the first threshold, the control unit may activate the alarming system.

S23: the clearing device may be provided with a recycling unit such as a crushing machine which may be provided at one side of the operating platform. As an example, after the first clearing unit performs the clearing operation on the operating surface, the foreign matter on the operating surface is moved into the crushing machine to be smashed and compacted.

In the present example, if the second clearing unit, such as the vacuum suction device, is provided in the clearing device, the operating method of the clearing device in the above example may further include following steps.

S24: after the first clearing unit performs the clearing operation on the operating surface of the operating platform, the vacuum suction device vacuums the foreign matter on the operating surface. For example, the vacuum suction device may be configured to perform vacuum suction operation on the entire operating surface, for example, the length of vacuum suction device may be the same as the length of the operating surface.

The control unit may also be provided with a second threshold for limiting the count of the operation of the vacuum suction device. For example, when the count of the operation of the vacuum suction device is greater than the second threshold, the control unit may perform related protection operation, such as stopping the operation of the vacuum suction device and other devices and/or activating the alarming system for human intervention, to protect the clearing device. It should be noted that, according to the embodiments of the clearing device provided by the present disclosure, it is known that the vacuum suction device may clean the foreign matter on the operating surface together with the first clearing unit described above, and may also clear the foreign matter on the operating surface in place of the first clearing unit described above. The setting of the second threshold may refer to the related description of the first threshold.

It is to be noted that in the embodiment provided by the present disclosure, for example, the specific flow of the cutting process and the clearing process may be arranged according to the structure of equipment in actual production. For example, the above clearing unit is a brush. If the cutting process and clearing process need to be performed at different positions of the operating platform, the operating platform needs to be moved. For example, after cutting of the display panel (motherboard) on the operating platform is completed, the useful daughterboard of the display panel may be taken away, the operating platform may be moved to, for example, a position where the brush is located, and then a clearing process is performed for the foreign matter on the operating surface of the operating platform. The movement manner of the operating platform may be implemented by means of, for example, lifting, transmission or the like, and the embodiments of the present disclosure are not limited thereto.

Other several points need to be explained as for the present disclosure.

(1) The accompanying drawings of embodiments of the present disclosure relate only to the structures related to the embodiments of the present disclosure, and other structures may refer to conventional designs.

(2) For clarity, the thickness of the layer or region is zoomed in or out in the drawings for describing the drawings of embodiments of the present disclosure, that is, the drawings are not drawn to actual proportions.

(3) The embodiments of the present disclosure and features of the embodiments may be combined with each other to obtain new embodiments, without conflict.

As described above, only the specific embodiments of the present disclosure are illustrated, but the protection scope of the present disclosure is not limited thereto. The protection scope of the present disclosure should be based on the protection scope of the claims.

What is claimed is:

1. A clearing device, comprising:
an operating platform, comprising an operating surface;
a first clearing unit, provided on a side of the operating platform close to the operating surface;
a control unit, configured to communicate with the first clearing unit and control a clearing operation and a count of the operation of the first clearing unit;
at least one detecting unit, provided on the operating platform and communicatively connected to the control unit,
wherein the first clearing unit is configured to clear a foreign matter on the operating surface, the detecting unit is configured to detect a degree of cleanliness of the operating surface and send to the control unit a data signal which reflects the degree of cleanliness of the operating surface.

2. The clearing device according to claim 1, wherein
in the case where the data signal reflects that the operating surface is not clear, the control unit is configured to control the first clearing unit to clean the operating surface again; or
in the case where the data signal reflects that the operating surface is clear, the control unit is configured to control the first clearing unit to stop cleaning the operating surface.

3. The clearing device according to claim 1, wherein the detecting unit comprises a transmitting terminal for transmitting a signal and a receiving terminal for receiving the signal, the transmitting terminal and the receiving terminal being located at two opposite sides of the operating platform respectively.

4. The clearing device according to claim 3, wherein the signal comprises a laser or an ultrasonic wave.

5. The clearing device according to claim 1, wherein the control unit is provided with a first threshold for limiting the count of the operation of the first clearing unit.

6. The clearing device according to claim 1, further comprising a crushing machine provided on a side of the operating platform.

7. A cutting device, comprising a clearing device, wherein the clearing device comprises:

an operating platform, comprising an operating surface;

a first clearing unit, provided on a side of the operating platform close to the operating surface;

a control unit, configured to communicate with the first clearing unit and control a clearing operation and a count of the operation of the first clearing unit;

at least one detecting unit, provided on the operating platform and communicatively connected to the control unit, wherein the first clearing unit is configured to clear a foreign matter on the operating surface, the detecting unit is configured to detect a degree of cleanliness of the operating surface and send to the control unit a data signal which reflects the degree of cleanliness of the operating surface.

8. The cutting apparatus according to claim 7, wherein in the case where the data signal reflects that the operating surface is not clear, the control unit is configured to control the first clearing unit to clean the operating surface again; or in the case where the data signal reflects that the operating surface is clear, the control unit is configured to control the first clearing unit to stop cleaning the operating surface.

9. The cutting device according to claim 7, wherein the detecting unit comprises a transmitting terminal for transmitting a signal and a receiving terminal for receiving the signal, the transmitting terminal and the receiving terminal being located at two opposite sides of the operating platform respectively.

10. An operating method of the clearing device according to claim 1, comprising:

controlling the first clearing unit to perform a clearing operation once on the operating surface;

detecting the degree of cleanliness of the operating surface, and sending the detected data signal to the control unit; and controlling the control unit to analyze the data signal, to judge whether to perform a next clearing operation.

11. The operating method of claim 10, wherein in the case where the control unit determines that a foreign matter exists on the operating surface, performing the next clearing operation on the operating surface and detecting the degree of cleanliness of the operating surface which has been subject to the clearing operation; or in the case where the control unit determines that no foreign matter exists on the operating surface, ending the clearing operation of the clearing device.

* * * * *